(12) United States Patent
Sakamoto

(10) Patent No.: US 11,332,128 B2
(45) Date of Patent: May 17, 2022

(54) DRIVING ASSISTANCE APPARATUS

(71) Applicant: TOYOTA JIDOSHA KABUSHIKI KAISHA, Toyota (JP)

(72) Inventor: Hiroshi Sakamoto, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 221 days.

(21) Appl. No.: 16/175,940

(22) Filed: Oct. 31, 2018

(65) Prior Publication Data

US 2019/0176816 A1 Jun. 13, 2019

(30) Foreign Application Priority Data

Dec. 13, 2017 (JP) .............................. JP2017-238698

(51) Int. Cl.
*B60W 30/09* (2012.01)

(52) U.S. Cl.
CPC ......... *B60W 30/09* (2013.01); *B60W 2554/80* (2020.02); *B60W 2555/60* (2020.02); *B60W 2900/00* (2013.01)

(58) Field of Classification Search
CPC .... B60W 30/08; B60W 30/09; B60W 30/095; B60W 30/0953; B60W 30/0956; B60W 2555/60; B60W 2554/80; B60W 2900/00; B60W 2520/10; B60W 2520/12; B60W 2550/30; B60W 50/14; B60W 2050/143; B60W 2510/06; B60W 2520/00; B60W 2550/10; B60W 2550/304; B60W 2550/308; G08G 1/163; G08G 1/166; G08G 1/16; G08G 1/09; B60R 21/00

USPC .......................................................... 701/23
See application file for complete search history.

(56) References Cited

U.S. PATENT DOCUMENTS

| | | | |
|---|---|---|---|
| 2011/0082623 A1* | 4/2011 | Lu .................... | B60W 30/09 |
| | | | 701/41 |
| 2013/0110343 A1 | 5/2013 | Ichikawa et al. | |
| 2013/0253815 A1 | 9/2013 | Orfila et al. | |

(Continued)

FOREIGN PATENT DOCUMENTS

| | | |
|---|---|---|
| JP | 2009-53923 A | 3/2009 |
| JP | 2011-109509 A | 6/2011 |

(Continued)

*Primary Examiner* — Jess Whittington
*Assistant Examiner* — Terry C Buse
(74) *Attorney, Agent, or Firm* — Sughrue Mion, PLLC

(57) ABSTRACT

A driving assistance apparatus includes a surrounding object recognition unit configured to recognize a surrounding object, a signal recognition unit configured to recognize a state of a light color of a traffic signal, and an assistance unit configured to assist driving of the host vehicle. The assistance unit is configured to determine whether or not there is a possibility that the host vehicle will come into contact with the surrounding object if the state of the light color is a state of prohibiting the host vehicle from proceeding in one or a plurality of specific directions and when the host vehicle proceeds in that specific direction, and calculate a withdrawal route candidate for the host vehicle to leave from the intersection without coming into contact with the surrounding object if it is determined that there is the possibility that the host vehicle will come into contact with the surrounding object.

8 Claims, 9 Drawing Sheets

(56) References Cited

U.S. PATENT DOCUMENTS

| | | | |
|---|---|---|---|
| 2015/0375743 A1* | 12/2015 | Izuhara | B60W 30/08 |
| | | | 701/36 |
| 2016/0185348 A1 | 6/2016 | Miura et al. | |
| 2016/0335892 A1 | 11/2016 | Okada et al. | |
| 2017/0277194 A1* | 9/2017 | Frazzoli | B60W 60/0015 |
| 2018/0151066 A1* | 5/2018 | Oba | G01C 21/3407 |
| 2018/0173231 A1 | 6/2018 | Takae et al. | |
| 2018/0218601 A1* | 8/2018 | Aoki | G08G 1/096725 |
| 2018/0222476 A1* | 8/2018 | Ishii | G01S 17/931 |
| 2018/0239358 A1* | 8/2018 | Choi | G05D 1/0212 |
| 2019/0106111 A1* | 4/2019 | Matsunaga | B60W 30/18163 |
| 2019/0143968 A1* | 5/2019 | Song | B60R 11/04 |
| | | | 701/301 |
| 2020/0110422 A1* | 4/2020 | Takamatsu | B60R 21/00 |

FOREIGN PATENT DOCUMENTS

| | | |
|---|---|---|
| JP | 2011-146053 A | 7/2011 |
| JP | 2011-162132 A | 8/2011 |
| JP | 2013-218678 A | 10/2013 |
| JP | 2016-126400 A | 7/2016 |
| WO | 2011/158347 A1 | 12/2011 |
| WO | 2015/136958 A1 | 9/2015 |
| WO | 2016/113926 A1 | 7/2016 |

* cited by examiner

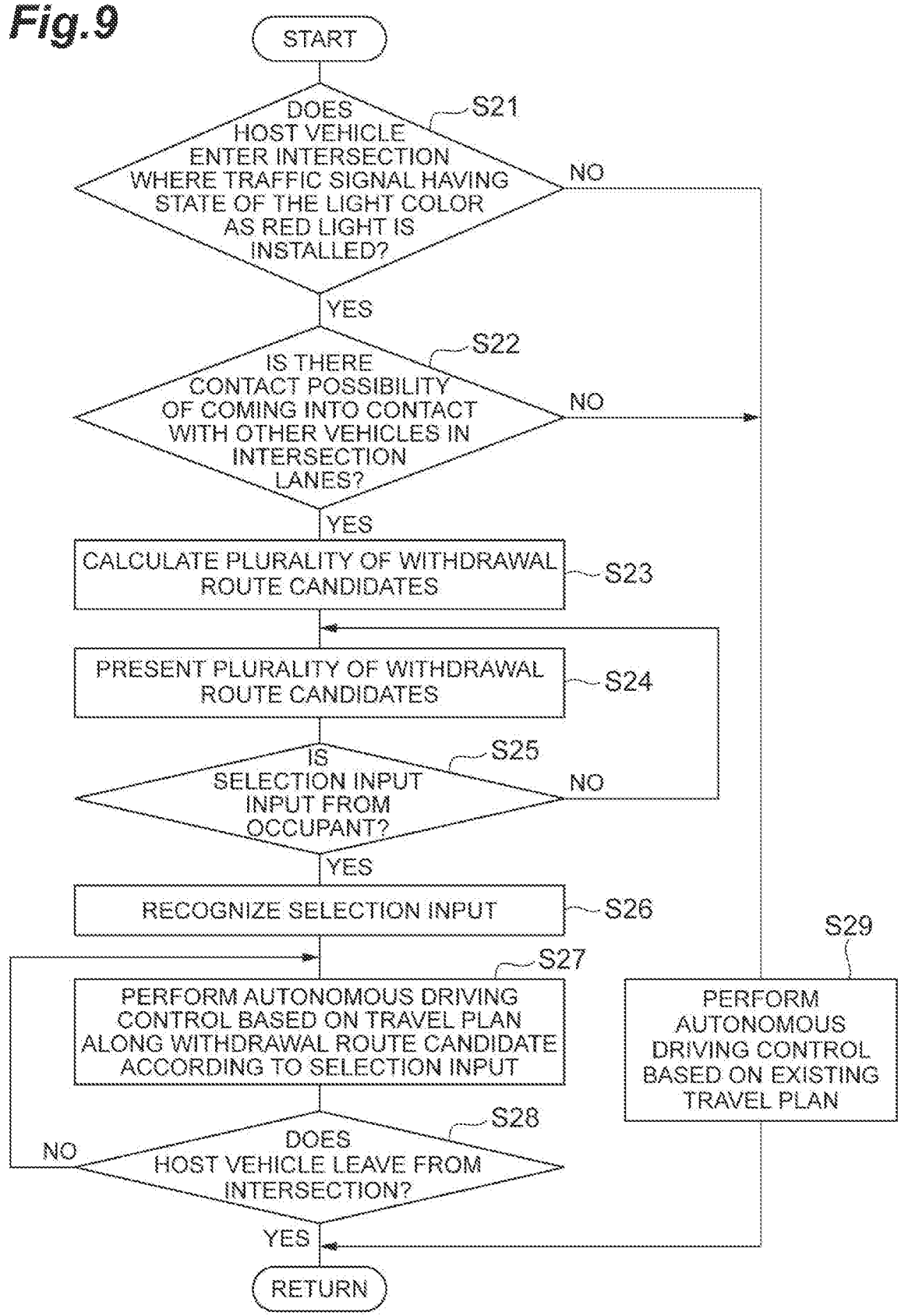

DRIVING ASSISTANCE APPARATUS

TECHNICAL FIELD

An aspect of the present disclosure relates to a driving assistance apparatus.

BACKGROUND

In the related art, Japanese Unexamined Patent Publication No. 2011-146053 is known as a technical literature relating to a driving assistance apparatus. In Japanese Unexamined Patent Publication No. 2011-446053, a driving assistance apparatus is disclosed, which receives signal information from a traffic signal installed at an intersection and assists a safe driving of the vehicle. In the driving assistance apparatus described in Japanese Unexamined Patent Publication No. 2011-146053, when the light color of the traffic signal at the intersection is switched to red, if a host vehicle passes through a point between a stop line and a stop position of a facing right turn vehicle at the intersection, information for accelerating and decelerating the host vehicle is output.

SUMMARY

In the related art described above, for example, in a scene in which the host vehicle enters the intersection where the light color of the traffic signal is red and in a scene in which the host vehicle proceeds in a direction other than an arrow indicated by the arrow type traffic signal at the intersection, there is still room for improvement in order to prevent the host vehicle from interfering with the traffic.

An object of an aspect of the present disclosure is to provide a driving assistance apparatus that can prevent a host vehicle from interfering with the traffic.

A driving assistance apparatus according to an aspect of the present disclosure includes a surrounding object recognition unit configured to recognize a surrounding object around the host vehicle, a signal recognition unit configured to recognize a state of a light color of a traffic signal in front of the host vehicle, and an assistance unit configured to assist driving of the host vehicle based on a result of recognition performed by the surrounding object recognition unit and a result of recognition performed by the signal recognition unit. The assistance unit is configured to determine whether or not there is a possibility that the host vehicle will come into contact with the surrounding object if the state of the light color in the intersection of the traffic signal is a state of prohibiting the host vehicle from proceeding in one or a plurality of specific directions and when the host vehicle proceeds in that specific direction. The assistance unit is configured to calculate a withdrawal route candidate for the host vehicle to leave from the intersection without coming into contact with the surrounding object if it is determined that there is the possibility that the host vehicle will come into contact with the surrounding object.

In this driving assistance apparatus, if the state of the light color in the intersection of the traffic signal is a state of prohibiting the host vehicle from proceeding in one or a plurality of specific directions, even when the host vehicle proceeds in that specific direction and there is the possibility of coming into contact with the surrounding object, it is possible to avoid the host vehicle V from coming into contact with the surrounding object by causing the host vehicle to travel along the withdrawal route candidate and to leave from the intersection. It is possible to prevent the host vehicle from interfering with the traffic.

In the driving assistance apparatus in the aspect of the present disclosure, the assistance unit may be configured to calculate a surrounding object predicted route which is a predicted route of the surrounding object and a host vehicle predicted route which is a predicted route of the host vehicle, and may configured to determine whether or not there is the possibility that the host vehicle will come into contact with the surrounding object based on the surrounding object predicted route and the host vehicle predicted route. The assistance unit may be configured to calculate a withdrawal route candidate that is different from the host vehicle predicted route if it is determined that there is the possibility that the host vehicle will come into contact with the surrounding object. In this way, it possible to specifically realize the avoidance of contact between the host vehicle and the surrounding object.

In the driving assistance apparatus in the aspect of the present disclosure, the intersection has a plurality of intersection lanes. The assistance unit may be configured to calculate a route to enter a first near side intersection lane which is an intersection lane on a side nearer than a contact position among the plurality of intersection lanes as the withdrawal route candidate, if it is determined that there is the possibility that the host vehicle will come into contact with the surrounding object. As above, the withdrawal route candidate is a route to enter the first near side intersection lane on a side nearer than the contact position. Accordingly, the withdrawal route candidate is a route that makes the host vehicle leave from the intersection without contacting the surrounding object, and thus, is the safer route.

In the driving assistance apparatus according to the aspect of the present disclosure, the assistance unit may be configured to determine whether or not another surrounding object is present on the withdrawal route candidate, and may be configured to change the withdrawal route candidate to a route to enter a second near side intersection lane which is on a side nearer than the first near side intersection lane if it is determined that the other surrounding object is present on the withdrawal route candidate. In this way, even if another surrounding object is present, it is possible to prevent the host vehicle from coming into contact with the other surrounding object.

In the driving assistance apparatus according to the aspect of the present disclosure, the assistance unit may be configured to calculate a plurality of withdrawal route candidates and to present the plurality of calculated withdrawal route candidates to an occupant, and may be configured to perform the driving control of the host vehicle based on the withdrawal route candidate according to an input for selecting any one of the plurality of withdrawal route candidates if the input is performed by the occupant. In this way, it is possible to prevent the host vehicle from interfering with the traffic based on the input from the occupant.

According to an aspect of the present disclosure, it is possible to provide a driving assistance apparatus that can prevent the host vehicle from interfering with the traffic.

BRIEF DESCRIPTION OF THE DRAWINGS

FIG. 3B is an overhead view illustrating a scene of driving processing performed by the driving assistance apparatus in. FIG. 1.

FIG. 9 is a flowchart illustrating a processing performed by the driving assistance apparatus in FIG. 8.

DETAILED DESCRIPTION

Figure 1:
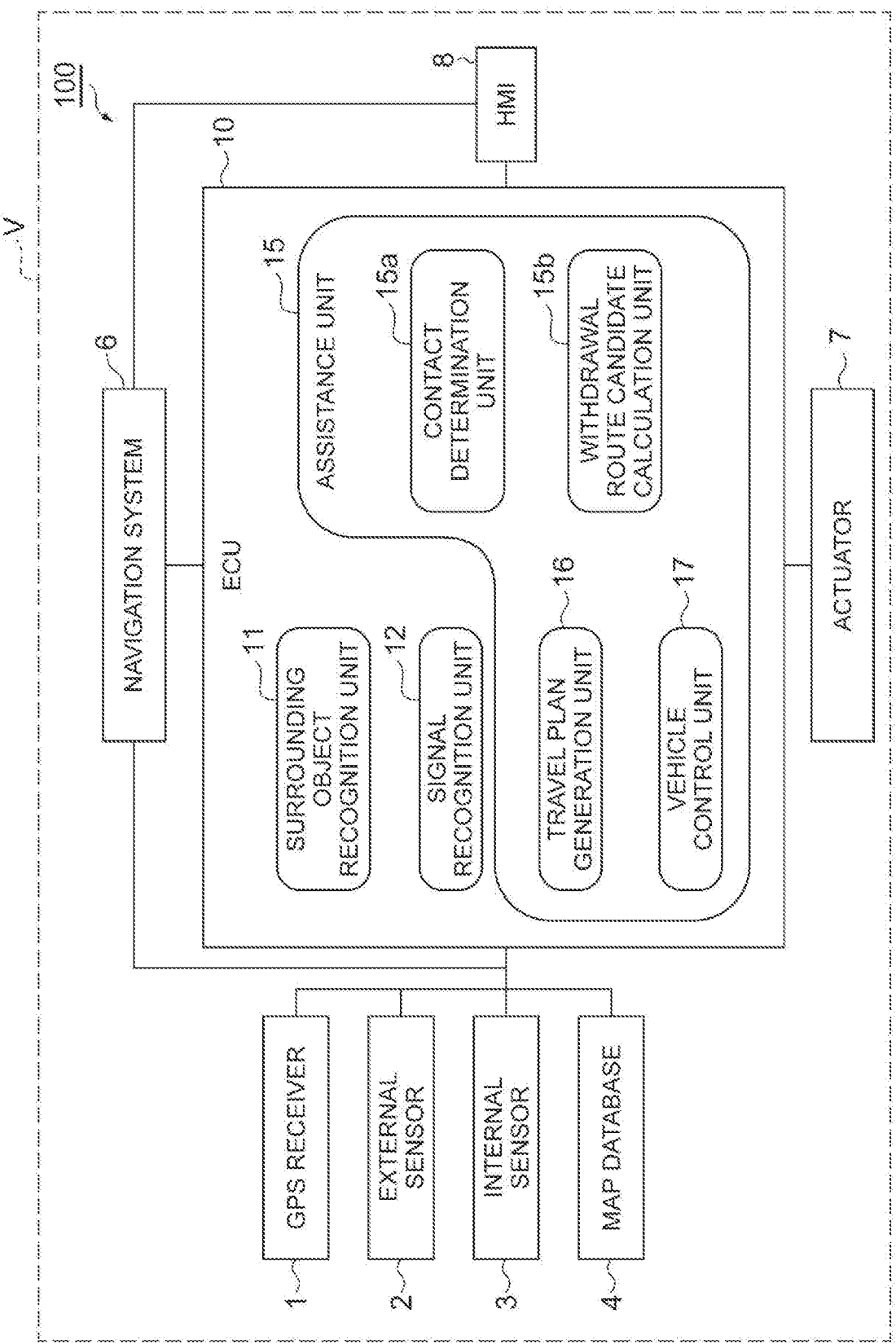
FIG. 1 is a block diagram illustrating a driving assistance apparatus in a first embodiment.

Hereinafter, embodiments of the present disclosure will be described with reference to the drawings. In the description below, the same reference numerals will be given to the same or equivalent elements, and the descriptions thereof will be omitted.

First Embodiment

FIG. 1 is a block diagram illustrating a driving assistance apparatus 100 in a first embodiment. As illustrated in FIG. 1, the driving assistance apparatus 100 is mounted on a host vehicle V such as a passenger car. The driving assistance apparatus 100 can perform an autonomous driving control of the host vehicle V. The autonomous driving control means a vehicle control that causes the host vehicle V to autonomously travel toward a destination set in advance. In the autonomous driving control, occupants (including a driver) do not need to perform a driving operation, and the host vehicle V autonomously travels.

The driving assistance apparatus 100 includes an electronic control unit (ECU) 10 that performs an overall management of the system. The ECU 10 is an electronic control unit including a central processing unit (CPU), read only memory (ROM), random access memory (RAM) and the like. In the ECU 10, for example, various functions are realized by loading a program stored in the ROM into the RAM and executing the program loaded in the RAM by the CPU. The ECU 10 may be configured with a plurality of electronic control units.

The ECU 10 is connected to a GPS receiver 1, an external sensor 2, an internal sensor 3, a map database 4, a navigation system 6, an actuator 7, and a human machine interface (HMI) 8.

The GPS receiver 1 measures a position of the host vehicle V (for example, latitude and longitude of the host vehicle V) by receiving signals from equal to or more than three GPS satellites. The OPS receiver 1 transmits information on the measured position of the host vehicle V to the ECU 10.

The external sensor 2 is a detection device that detects a surrounding environment of the host vehicle V. The external sensor 2 includes a camera and a radar sensor. The camera is an imaging device that images the external situation of the host vehicle V. The camera is provided on at least the inside of a windshield of the host vehicle V The camera transmits image information relating to surroundings of the host vehicle V to the ECU 10. The camera may be a monocular camera or may be a stereo camera. The stereo camera has two imaging units that are arranged so as to reproduce a binocular parallax. The radar sensor is a detection device that detects obstacles around the host vehicle V using radio waves (for example, millimeter waves) light. The radar sensor includes, for example, millimeter wave radar or a light detection and ranging (LIDAR). The radar sensor transmits the radio wave or light to the surroundings of the host vehicle V, and detects the obstacles by receiving radio waves or light reflected from obstacles. The radar sensor transmits the detected obstacle information to the ECU 10. The obstacles include fixed objects such as guardrails and buildings, and moving obstacles such as pedestrians, bicycles, other vehicles, and the like.

The internal sensor 3 is a detection device that detects a travel state and a vehicle state of the host vehicle V. The internal sensor 3 includes a vehicle speed sensor, an accelerator sensor, and a yaw rate sensor. The vehicle speed sensor is a measurement device that measures a speed of the host vehicle V. As the vehicle speed sensor, for example, a vehicle wheel speed sensor is used, which is provided on vehicle wheels of the host vehicle V or on a drive shaft rotating integrally with vehicle wheels, and measures a rotational speed of the vehicle wheels. The vehicle speed sensor transmits the measured vehicle speed information (vehicle wheel speed information) to the ECU 10. The accelerator sensor is a measurement device that measures an acceleration of the host vehicle V. The accelerator sensor includes, for example, a longitudinal accelerator sensor that measures acceleration in the longitudinal direction of the host vehicle V and a lateral accelerator sensor that measures a lateral acceleration of the host vehicle V. The accelerator sensor transmits, for example, acceleration information of the host vehicle V to the ECU 10. The yaw rate sensor is a measurement device that measures a yaw rate (rotation angular velocity) around the vertical axis at the center of gravity of the host vehicle V. As the yaw rate sensor, for example, a Gyro sensor can be used. The yaw rate sensor transmits the measured yaw rate information of the host vehicle V to the ECU 10. The internal sensor 3 includes a door sensor that detects the opening and closing of the door of the host vehicle V as the vehicle state.

The map database 4 is a database storing the map information. The map database 4 is formed, for example, in a hard disk drive (HDD) mounted on the host vehicle V. The map information includes information on the position of the road, information on the shape of the road (for example, types of curves or straight roads, a curvature of the curve, or the like), information on the position of the intersection and the branch, and information on the position of a building. The map information also includes traffic regulation information such as a speed limit associated with the position information. The map information also includes facility data including positions of the facilities and the types of the facilities (types of schools, hospitals, stations, convenience stores, and the like). The map database 4 may be stored in a computer in a facility such as a management center that can communicate with the host vehicle V.

The navigation system 6 is mounted on the host vehicle V and sets a target route on which the host vehicle V travels by the autonomous driving control. The navigation system 6 calculates the target route from the position of the host vehicle V to a destination based on the destination set in advance, the position of the host vehicle V measured by the GPS receiver 1, and the map information in the map database 4. The destination in the autonomous driving control is set by the occupant of the host vehicle V operating the input, button (or touch panel) of the navigation system 6. The target route is set by distinguishing the lanes that constitute the road. In navigation system 6, the target route can be set by a well-known method. The navigation system 6 may have a function of performing a guidance along the target route during the manual driving of the host vehicle V by the occupant. The navigation system 6 outputs the information on the target route of the host vehicle V to the ECU 10. A part of the functions of the navigation system 6 may be performed by a server of a facility such as an information processing center capable of communicating with the host vehicle V. The function of the navigation system 6 may be performed in the ECU 10.

As in the "driving assistance apparatus" disclosed in Japanese Patent No. 5382218 (WO2011/158347), or the roadway traveling route in the "autonomous driving apparatus" disclosed in Japanese Unexamined Patent Publication No. 2011-162132, when the destination setting is not explicitly performed by the occupant, the target route described here also includes the target route autonomously generated based on the history of past destinations or the map information.

The actuator 7 is a device used for controlling the host vehicle V. The actuator 7 includes at least a throttle actuator, a brake actuator and a steering actuator. The throttle actuator controls a driving force of the host vehicle V by controlling an amount of air (throttle opening degree) supplied to the engine according to an acceleration control command value from the ECU 10. If the host vehicle V is a hybrid vehicle, in addition to the amount of air supplied to the engine, the acceleration control command value from the ECU 10 is input to a motor as a power source, and then, the driving force is controlled. If the host vehicle V is an electric vehicle, the acceleration control command value from the ECU 10 is input to a motor as a power source instead of the throttle actuator, and then, the driving force of the vehicle V is controlled. The motor as the power source in these cases configures the actuator 7. The brake actuator controls the brake system according to a deceleration control command value from the ECU 10 and controls a braking force applied to the wheels of the host vehicle V. For example, a hydraulic brake system can be used as the brake system. The steering actuator controls the driving of an assist motor controlling a steering torque of an electric powersteering system according to a steering control command value from the ECU 10. In this way, the steering actuator controls the steering torque of the host vehicle V.

The HMI 8 is an interface that performs inputting and outputting of the information between the driving assistance apparatus 100 and the occupant. The HMI 8 includes, for example, a display, a speaker, and the like. The HMI 8 outputs an image on the display and outputs a voice from the speaker according to a control signal from the ECU 10. The display may be a head-up display. For example, the HMI 8 includes input devices (buttons, a touch panel, a voice input device, or the like) for accepting input from the occupant.

Next, a functional configuration of the ECU 10 will be described. As illustrated in FIG. 1, the ECU 10 includes a surrounding object recognition unit 11, a signal recognition unit 12, and an assistance unit 15.

The surrounding object recognition unit 11 recognizes surrounding objects of the host vehicle V based on the result of detection performed by the external sensor 2. The surrounding object include obstacles such as such as another vehicle, pedestrians, bicycles, and the like around the host vehicle V. If a communication unit that performs at least one of a vehicle-to-vehicle communication and a road-to-vehicle communication is mounted on the host vehicle V, the surrounding object recognition unit 11 may recognize the surrounding object based on the result of communication instead of or in addition to the result of detection performed by the external sensor 2. The method of recognizing the surrounding object is not particularly limited, and various known recognition methods can be used.

The signal recognition unit 12 recognizes the state of the light color of the traffic signal in front of the host vehicle V based on the result of imaging performed by the camera of the external sensor 2. The traffic signal is a traffic signal indicating a signal relating to prohibition or permission of proceeding in order for securing the traffic safety or smoothing the flow of the traffic. If a plurality of traffic signals are present in front of the host vehicle V, among the plurality of traffic signals, the traffic signal of which the state of the light color is to be recognized may be a traffic signal installed in the intersection closest to the host vehicle V. Hereinafter, the traffic signal of which the state of the light color is to be recognized is simply referred to as a "traffic signal", the state of the light color of the traffic signal is simply referred to as a "state of the light color", and the intersection in which the traffic signal is installed is simply referred to as an "intersection".

The state of the light color includes a state in which the vehicles are prohibited from proceeding in one or a plurality of specific directions in the intersection. For example, the state of the light color includes a state in which red is lit, that is, a state in which the vehicles are prohibited from proceeding in all the specific directions (straight ahead and right or left turn) in the intersection. For example, if the traffic signal is an arrow type traffic signal, the state of the light color includes a state in which the vehicles are prohibited from proceeding in a direction other than the lit arrow in intersection. For example, the state of the light color includes a state in which red is lit and the right arrow is lit, that is, a state in which the vehicles are prohibited from proceeding (straight ahead and left turn) in directions other than the right direction.

If a communication unit that performs at least one of the vehicle-to-vehicle communication and the road-to-vehicle communication is mounted on the host vehicle V, the signal recognition unit 12 may recognize the state of the light color on the basis of the result of communication instead of or in addition to the result of imaging performed by the camera of the external sensor 2. The method of recognizing the state of the light color is not particularly limited, and various known methods of recognition can be used.

The assistance unit 15 assists the driving of the host vehicle V appropriately based on each of the inputs from the GPS receiver 1, the external sensor 2, the internal sensor 3, the map database 4, the navigation system 6, the HMI 8, the surrounding object recognition unit 11 and the signal recognition unit 12. The assistance unit 15 includes a travel plan generation unit 16, a vehicle control unit 17, a contact determination unit 15a, and a withdrawal route candidate calculation unit 15b.

The travel plan generation unit 16 generates a travel plan for the autonomous driving control based on the map information in the map database 4, path information from the navigation system 6, the information on the position of the host vehicle V recognized from the position information from the GPS receiver 1 or the map information from the map database 4, a surroundings situation of the host vehicle V recognized from the result of detection performed by the external sensor 2, and the travel state of host vehicle V recognized from the result of detection performed by the internal sensor 3.

The travel plan includes a steering plan relating to the steering of the host vehicle V and a vehicle speed plan relating to the vehicle speed of the host vehicle V. The steering plan includes a target steering angle corresponding to the position on the path on which the host vehicle V travels by the autonomous driving control. The position on the path means a position in the extending direction of the path (that is, the target route in the autonomous driving control) on the map. Specifically, the position on the path can be a set vertical position set for each predetermined interval (for example, 1 m) in the extending direction of the path. The target steering angle is a control target value of the steering angle of the host vehicle V in the travel plan. The travel plan generation unit 16 generates a steering plan by setting the target steering angle for each position away by a predetermined interval on the path. A target steering torque or a target lateral position (a target position of the host vehicle V in the width direction of the road) may be used instead of the target steering angle.

The target vehicle speed corresponding to the position on the path on which the host vehicle V travels by the autonomous driving control is included in the vehicle speed plan. The target vehicle speed is the control target value of the vehicle speed of the host vehicle V in the travel plan. The travel plan generation unit 16 generates the vehicle speed plan by setting the target vehicle speed for each position away by a predetermined interval on the path. A target acceleration or a target jerk may be used instead of the target vehicle speed. Instead of position on the path (set vertical position), time may be used as a reference. The travel plan may be, for example, a travel plan up to the future several seconds ahead of the current time.

If a withdrawal route candidate is determined by the withdrawal route candidate calculation unit 151 described below, the travel plan generation unit 16 generates a travel plan that causes the host vehicle V to travel along the withdrawal route candidate. In other words, if the withdrawal route candidate is determined, the travel plan generation unit 16 updates the existing travel plan to a travel plan that causes the host vehicle V to leave from the intersection according to the withdrawal route candidate.

The vehicle control unit 17 performs the autonomous driving control of the host vehicle V based on the map information, the position of the host vehicle V, the surroundings situation of the host vehicle V, and the travel state and the travel plan of the host vehicle V. The vehicle control unit 17 performs the autonomous driving control of host vehicle V along the travel plan by transmitting a control command value (a steering control command value, an acceleration control command value, a deceleration control command value, and the like) to the actuator 7. The vehicle control unit 17 can perform the autonomous driving control using a known method.

The contact determination unit 15a determines whether or not the state of the light color is a state that prohibits the vehicles from proceeding in one or a plurality of specific directions in the intersection, and the host vehicle V has proceeded in the specific direction based on the result of recognition performed by the signal recognition unit 12 and each result of detection performed by the external sensor 2 and internal sensor 3. When a part or all of host vehicle V enters the intersection over the stop line of the intersection in the specific direction, it is determined that the host vehicle V has proceeded in the specific direction in the intersection. Here, the contact determination unit 15a determines whether or not the host vehicle V entered the intersection (whether or not the host vehicle V proceeds straight ahead over the intersection stop line or turns to the right or left) when the state of the light color is a state of red light. In the determination whether or not the host vehicle V enters the intersection, it is unnecessary to consider whether or not the host vehicle V is in a traveling state (whether or not the host vehicle V is in a stopped state) at the time of the determination.

When it is determined that the host vehicle V proceeded in the specific direction, the contact determination unit 15a determines whether or not there is a possibility that the host vehicle V will come into contact with the surrounding object based on the result of recognition performed by the surrounding object recognition unit 11 (hereinafter, referred to as "contact possibility").

Specifically, the contact determination unit 15a calculates a surrounding object predicted route which is a predicted route of the surrounding object based on the result of recognition performed by the surrounding object recognition unit 11. The contact determination unit 15a calculates a host vehicle predicted route which is a predicted route of the host vehicle V based on at least one of the travel state and the travel plan of the host vehicle V. The contact determination unit 15a determines the presence or absence of the contact possibility that the host vehicle V will come into contact with the surrounding object based on the calculated surrounding object predicted route and the host vehicle predicted route. In the determination of the contact possibility, various contact determination methods (collision determination method) can be used. In the determination of the contact possibility, the predicted route can be generated using a known method. In the determination of the contact possibility, a trend of the position of the surrounding object on the surrounding object predicted route (a temporal change) and a trend of the position of the host vehicle V on the host vehicle predicted route may be taken into consideration.

If it is determined by the contact determination unit 15a that there is the contact possibility, the withdrawal route candidate calculation unit 15b calculates a withdrawal route candidate on which the host vehicle V leaves from the intersection without contacting the surrounding object. The withdrawal route candidate is a route different from the host vehicle predicted route.

Specifically, if the intersection has a plurality of intersection lanes, when it is determined by the contact determination unit 15a that there is the contact possibility, the withdrawal route candidate calculation unit 15b firstly calculates a contact position. For example, the contact position can be obtained from the surrounding object predicted route and the host vehicle predicted route. Among the plurality of intersection lanes, the withdrawal route candidate calculation unit 15b calculates and determines a route to enter the first near side intersection lane which is an intersection lane on a side nearer than the contact position, as the withdrawal route candidate. The intersection lane is a lane intersecting the traveling lane on which host vehicle V travels in the intersection. The near side is the side closer to the host vehicle V. The withdrawal route candidate here is a route to enter the first near side intersection lane, then, proceed through the first near side intersection lane, and exit the intersection.

Next, an example of processing by the driving assistance apparatus 100 will be described.

Figure 2:
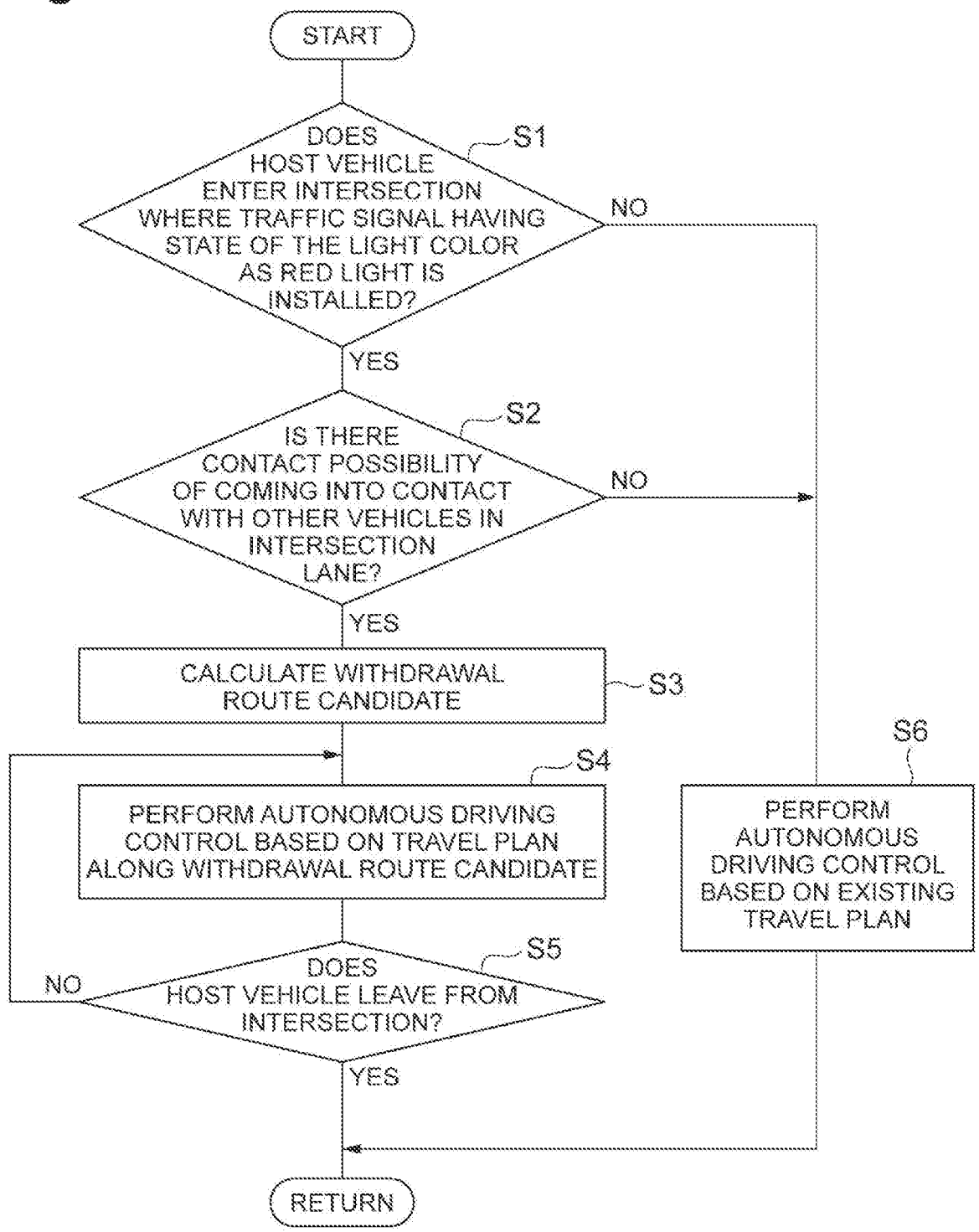
FIG. 2 is a flowchart illustrating processing performed by the driving assistance apparatus in FIG. 1.

FIG. 2 is a flowchart illustrating the processing relating to the driving assistance performed by the driving assistance apparatus 100 in FIG. 1. The processing in the flowchart illustrated in FIG. 2 is performed by the ECU 10 while the host vehicle V is traveling with the autonomous driving (during performing the autonomous driving control). Here, other vehicles traveling in the intersection lane are assumed to be the surrounding Objects. The state of red light is assumed to be the state of the light color that prohibits the vehicles from proceeding in one or a plurality of the specific directions in the intersection.

First, as illustrated in FIG. 2, the contact determination unit 15a determines whether or not the host vehicle V enters the intersection where the traffic signal TL having the state of the light color as red light is installed (STEP S1). If YES in STEP S1, the contact determination unit 15a determines whether or not there is a contact possibility of coming into contact with other vehicles in the intersection lane (STEP S2).

If YES in STEP S2, the withdrawal route candidate calculation unit 15b calculates the withdrawal route candidate (STEP S3). The travel plan generation unit 16 generates a travel plan along the withdrawal route candidate. The vehicle control unit 17 performs the autonomous driving control based on the travel plan (STEP S4). After STEP S4, if the host vehicle V leaves from the intersection (YES in STEP S5), the process returns to STEP S1.

If NO in STEP S1 or NO in STEP S2, the vehicle control unit 17 performs the autonomous driving control based on the existing travel plan (STEP S6). After STEP S6, the process returns to STEP S1.

FIGS. 3A, 3B, 4A, and 4B are overhead views illustrating scenes of the driving processing performed by the driving assistance apparatus 100. In the scenes illustrated in FIGS. 3A, 3B, 4A and 48, an intersection I has four intersection lanes K1 to K4. The state of the light color of a traffic signal TL is a state in which the arrow is not lit and red is lit instead of blinking. The travel plan for the host vehicle V is proceeding straight ahead.

Figure 3B:
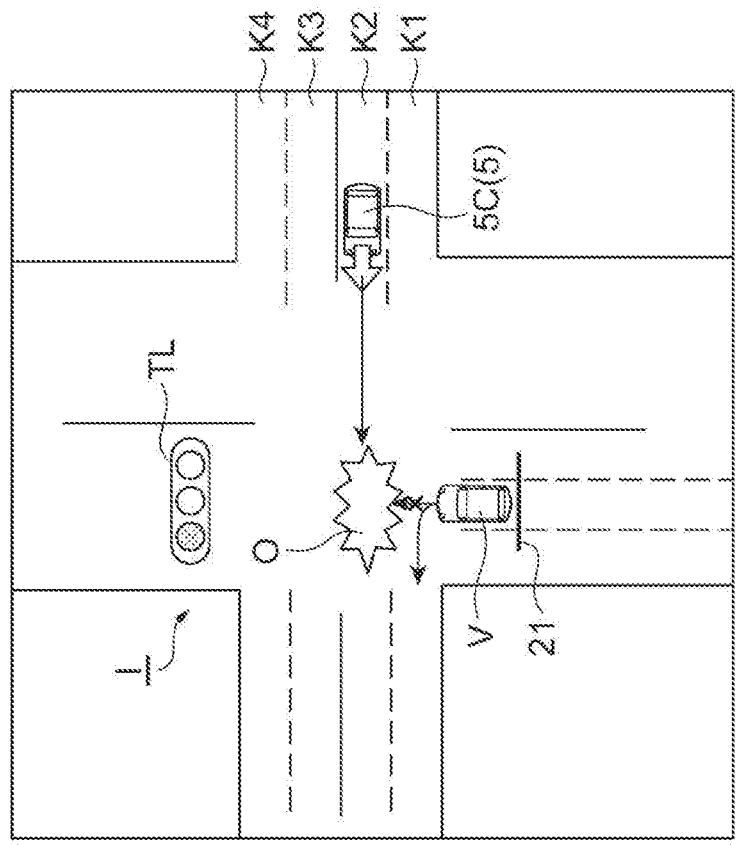
Figure 3A:
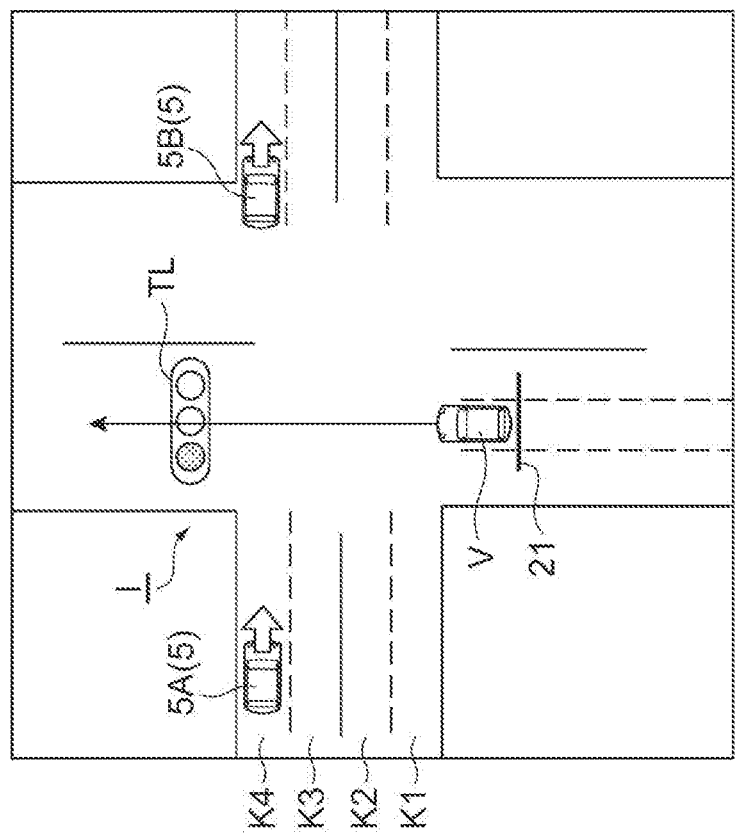
FIG. 3A is an overhead view illustrating a scene of driving processing performed by the driving assistance apparatus in FIG. 1.

In the scene illustrated in FIG. 3A, since the host vehicle V enters the intersection I over the stop line 21, it is determined that the host vehicle V proceeded in a specific direction where the vehicles are prohibited from proceeding in the intersection I. It is determined that other vehicles 5A and 5B will not come into contact with the host vehicle V. Accordingly, the withdrawal route candidate is not calculated, and thus, the autonomous driving control is continued according to the existing travel plan. As a result thereof, the host vehicle V proceeds straight ahead without changing the route, and leaves from the intersection I.

In the scene illustrated in FIG. 3B, since the host vehicle V enters the intersection I over the stop line 21, it is determined that the host vehicle V proceeded in a specific direction where the vehicles are prohibited from proceeding in the intersection I. It is determined that there is the possibility, that another vehicle 5C traveling in the intersection lane K2 and the host vehicle V will come into contact with each other. A contact position O where the other vehicle 5C and the host vehicle V will come into contact with each other is calculated, and among the plurality of intersection lanes K1 to K4, the intersection lane K1 which is on a side nearer than the contact position O is set as the first near side intersection lane. The route to enter the first near side intersection lane is determined as a withdrawal route candidate. The host vehicle V is autonomously driven based on the travel plan along the determined withdrawal route candidate. As a result thereof, the host vehicle V turns left, changes the route to the intersection lane K1, proceeds along the intersection lane K1, and then, leaves from the intersection I.

Figure 4B:
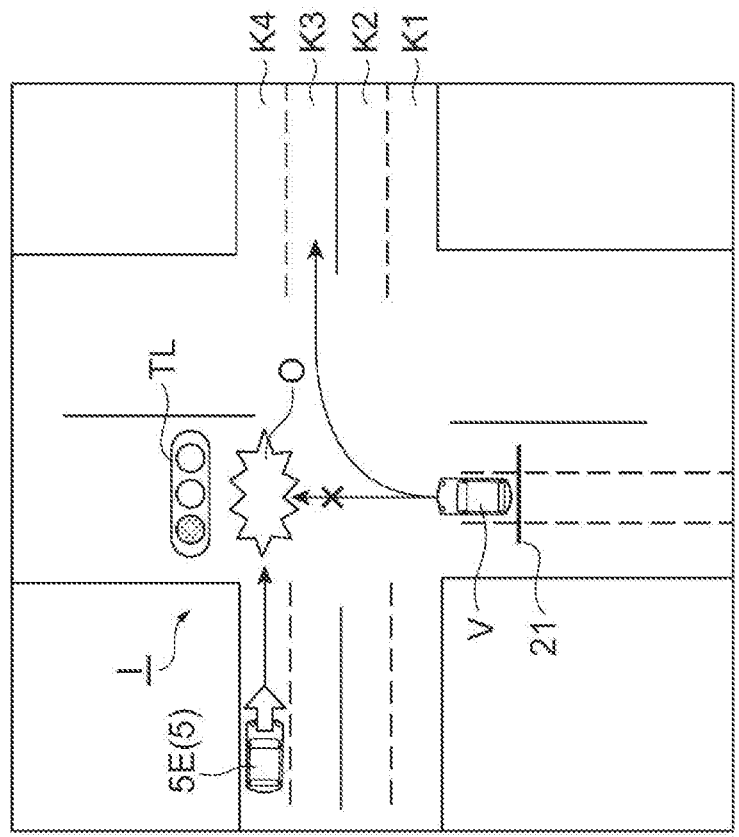
FIG. 4B is an overhead view illustrating a scene of driving processing performed by the driving assistance apparatus in FIG. 1.
Figure 4A:
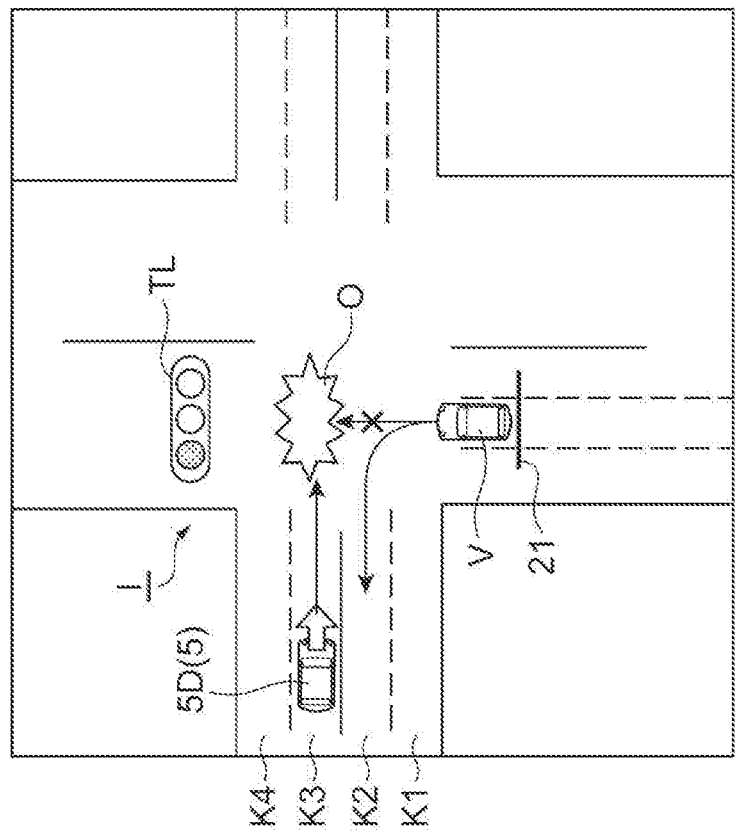
FIG. 4A is an overhead view illustrating a scene of driving processing performed by the driving assistance apparatus in FIG. 1.

In the scene illustrated in FIG. 4A, since the host vehicle V enters the intersection I over the stop line 21, it is determined that the host vehicle V proceeded in a specific direction where the vehicles are prohibited from proceeding in the intersection I. It is determined that there is the possibility that another vehicle 5D traveling in the intersection lane K3 and, the host vehicle V will come into contact with each other. A contact position O Where the other vehicle 5D and the host vehicle V will come into contact with each other is calculated, and among the plurality of intersection lanes K1 to K4, the intersection lane K2 which is on a side nearer than the contact position O is set as the first near side intersection lane. The route to enter the first near side intersection lane is determined as a withdrawal route candidate. The host vehicle V is autonomously driven based on the travel plan along the determined withdrawal route candidate. As a result thereof, the host vehicle V turns left, changes the route to the intersection lane K2, proceeds along the intersection lane K2, and then, leaves from the intersection I. Here, the first near side intersection lane may be the intersection lane K1.

In the scene illustrated in FIG. 4B, since the host vehicle V enters the intersection I over the stop line 21, it is determined that the host vehicle V proceeded in a specific direction where the vehicles are prohibited from proceeding in the intersection I. It is determined that there is the possibility that another vehicle 5E traveling in the intersection lane K4 and the host vehicle V will come into contact with each other. A contact position O where the other vehicle 5E and the host vehicle V will come into contact with each other is calculated, and among the plurality of intersection lanes K1 to K4, the intersection lane K3 which is on a side nearer than the contact position O is set as the first near side intersection lane. The route to enter the first near side intersection lane is determined as a withdrawal route candidate. The host vehicle V is autonomously driven based on the travel plan along the determined withdrawal route candidate. As a result thereof, the host vehicle V turns right, changes the route to the intersection lane K3, proceeds along the intersection lane K3, and then, leaves from the intersection I. Here, the first near side intersection lane may he at least one of the intersection lane K1 and the intersection lane K2.

Incidentally, if the traffic signal TL in front of host vehicle V is in red light, a scene can be considered, in which the host vehicle V enters the intersection I of the traffic signal TL and there is the possibility that the host vehicle V and the other vehicle 5 traveling in the intersection lanes K1 to K4 will come into contact with each other. In other words, a scene can be considered, in which, when the state of the light color in the intersection I is in a state in which the vehicles are prohibited from proceeding in one or a plurality of specific directions, the host vehicle V may proceed in this specific direction, and thus, there is the possibility of coming into contact with the surrounding object. Even in such a scene, according to the driving assistance apparatus 100, by causing the host vehicle V to travel along the withdrawal route candidate and to leave from the intersection I, it is possible to avoid the host vehicle V from coming in contact with the surrounding object (another vehicle 5). It is possible to prevent the host vehicle V from interfering with the traffic. It is possible to prevent the host vehicle V from interfering with the travel of the other vehicle 5. It is possible to change the route of the host vehicle V to such a route as to ride on the traveling flow of the other vehicle 5, and even if the collision occurs in any case, it is possible to prevent the damage.

In the driving assistance apparatus 100, the surrounding object predicted route and the host vehicle predicted route is calculated and the contact possibility between the host vehicle V and another vehicle 5 is determined based on the surrounding object predicted route and the host vehicle predicted route. If it is determined that there is the contact possibility, the withdrawal route candidate which is different from the host vehicle predicted route is calculated. In this way, it is possible to specifically realize the avoidance of contact between the host vehicle V and the other vehicle 5.

In the driving assistance apparatus 100, there are a plurality of intersection lanes K1 to K4 in the intersection. If it is determined that the host vehicle V comes in contact with the other vehicle 5, among the plurality of intersection lanes K1 to K4, the route to enter the first near side intersection lane which is on a side nearer than the contact position O is calculated as the withdrawal route candidate. As described above, the withdrawal route candidate is a route to enter the first near side intersection lane which is on a side nearer than the contact position O. Accordingly, the withdrawal route candidate is a route that makes the host vehicle V leave from the intersection I without contacting the other vehicle 5, and thus, is the safer route.

Second Embodiment

Next, a driving assistance apparatus according to a second embodiment will be described. In the description of the present embodiment, a point different from that in the first embodiment will he described.

Figure 5:
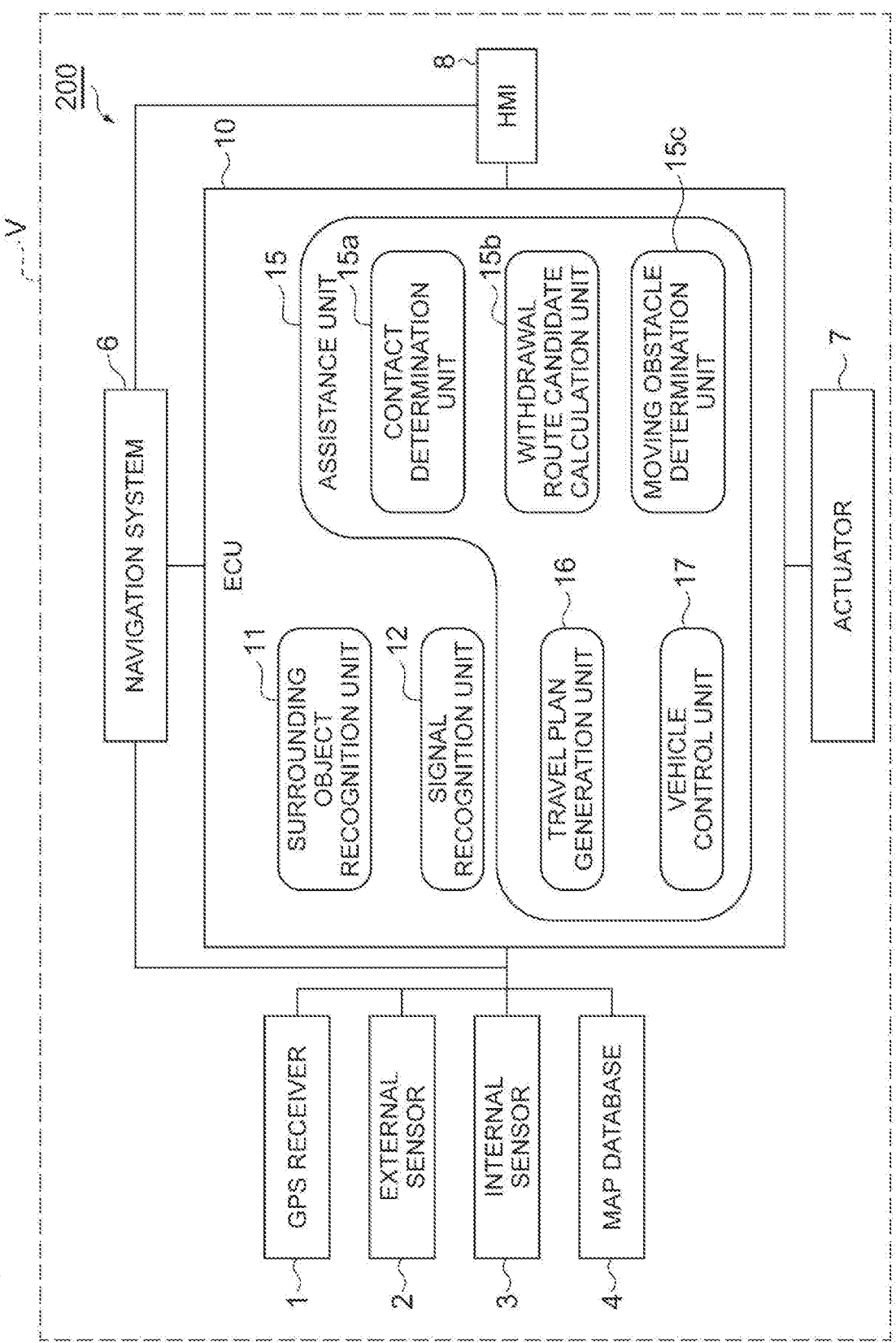
FIG. 5 is a block diagram illustrating a driving assistance apparatus in a second embodiment.

FIG. 5 is a block diagram illustrating a driving assistance apparatus 200 in the second embodiment. As illustrated in FIG. 5, the assistance unit 15 of the driving assistance apparatus 200 further includes a moving obstacle determination unit 15c.

The moving obstacle determination unit 15c determines whether or not a moving obstacle is present on the withdrawal route candidate calculated by the withdrawal route candidate calculation unit 15b based on the surroundings situation of the host vehicle V. The moving obstacle of which the presence is to be determined by the moving obstacle determination unit 15c is a surrounding object other than the surrounding object of which the contact possibility is determined by the contact determination unit 15a.

If the moving obstacle determination unit 15c determines that a moving obstacle is present on the withdrawal route candidate, the withdrawal route candidate calculation unit 15b changes the withdrawal route candidate to a route to enter a second near side intersection lane which is on a side nearer than the intersection lane (the first near side intersection lane) in the withdrawal route candidate.

If the intersection lane which is on a side nearer than the intersection lane is not present in the withdrawal route candidate (for example, if the intersection lane in the withdrawal route candidate is the intersection lane which is in the nearest side of the intersection lane), the assistance unit 15 may cause the host vehicle V to perform an avoidance behavior. The avoidance behaviors include an avoidance behavior of, for example, performing a steering control to make the direction (traveling direction) of the host vehicle V be the same as the direction (traveling direction) of another vehicle in the intersection lane. Instead of or in addition to this, the avoidance behaviors include an avoidance behavior of, for example, performing a breaking control to decelerate and stop the host vehicle V.

Figure 6:
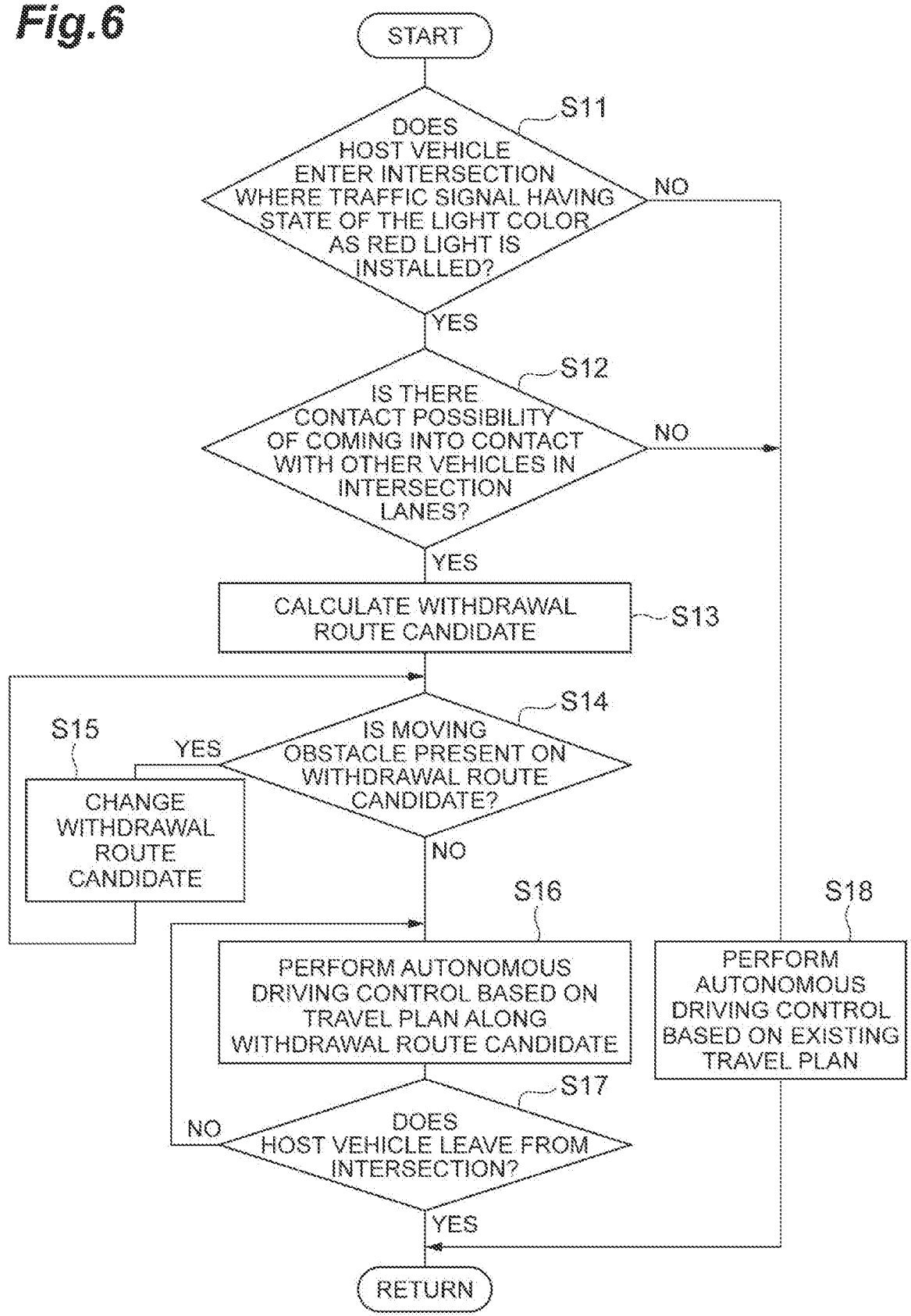
FIG. 6 is a flowchart illustrating processing performed by the driving assistance apparatus in FIG. 5.

FIG. 6 is a flowchart illustrating processing for the driving assistance performed by the driving assistance apparatus 200 in FIG. 5. The processing in the flowchart illustrated in FIG. 6 is performed by the ECU 10 while the host vehicle V is traveling by the autonomous driving. First, as illustrated in FIG. 6, the contact determination unit 15a determines whether or not the host vehicle V enters the intersection I where the traffic signal TL having the state of the light color as red light is installed (STEP S11). If YES in STEP S11, the contact determination unit 15a determines whether or not there is a contact possibility of coming into contact with other vehicles in the intersection lanes K1 to K4 (STEP S12).

If YES in STEP S12, the withdrawal route candidate calculation unit 15b calculates the withdrawal route candidate (STEP S13). The moving obstacle determination unit 15c determines whether or not a moving obstacle is present on the withdrawal route candidate calculated in STEP S13 (STEP S14).

If YES in STEP S14, the withdrawal route candidate calculation unit 15b changes the withdrawal route candidate to a route to enter the intersection lane (a second near side intersection lane) which is on a side nearer than the intersection in the current withdrawal route candidate (the first near side intersection lane) (STEP S15). Then, the process returns to the STEP S14. If the intersection lane of the near side is not present in STEP S15, the host vehicle V performs an avoidance behavior.

If NO in STEP S14, the travel plan generation unit 16 generates a travel plan along the withdrawal route candidate. The vehicle control unit 17 performs the autonomous driving control based on the travel plan (STEP S16). Subsequent to STEP S16, if host vehicle V leaves intersection I (YES in STEP S17), the process returns to STEP S11. If NO in STEP S11 or if NO in STEP S12, the vehicle control unit 17 performs the autonomous driving control based on the existing travel plan (STEP S18). Subsequent to STEP S18, the process returns to STEPS 11.

Figure 7:
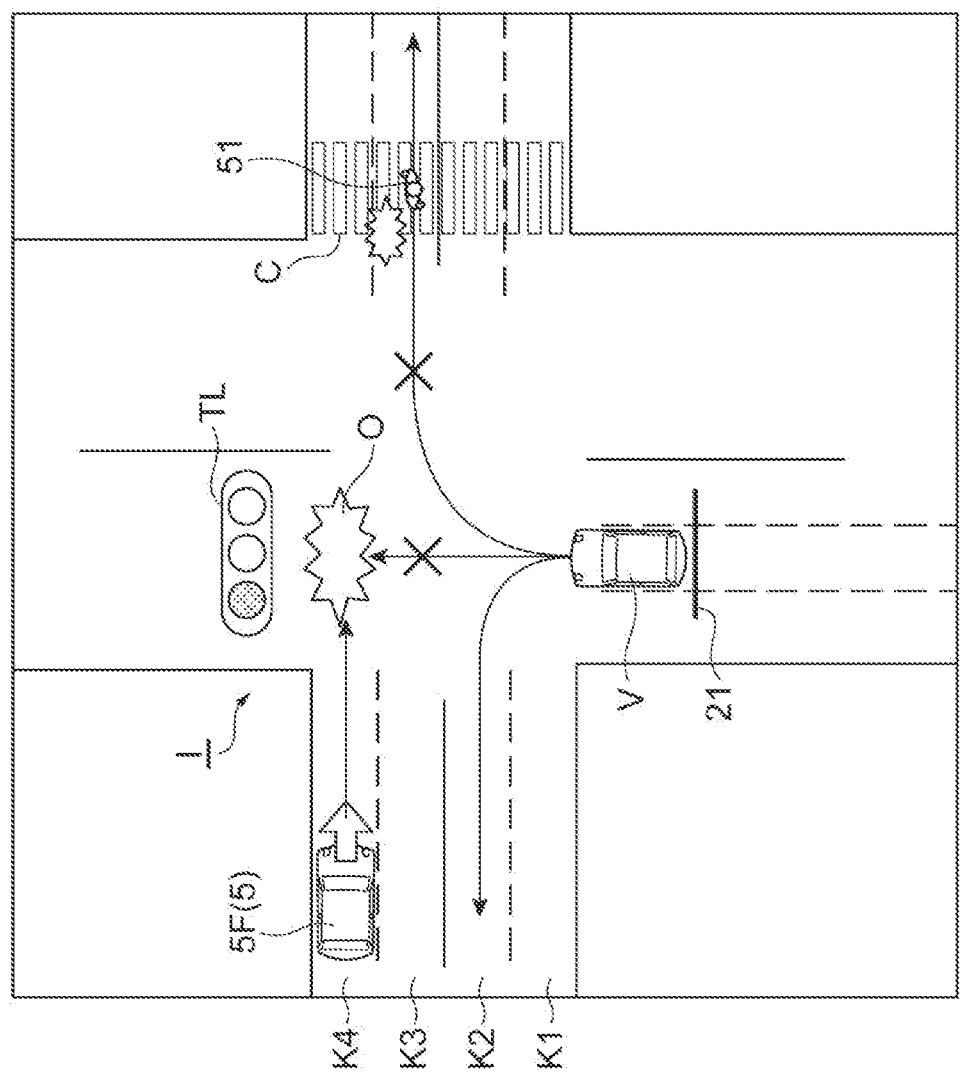
FIG. 7 is an overhead view illustrating a scene of driving processing performed by the driving assistance apparatus in FIG. 5.

FIG. 7 is an overhead view illustrating a scene of driving processing performed by the driving assistance apparatus 200. In the scene illustrated in FIG. 7, the intersection I has four intersection lanes K1 to K4. The state of the light color of a traffic signal TL is a state in which the arrow is not lit and red is lit instead of blinking. The travel plan for the host vehicle V is proceeding straight ahead.

In the illustrated scene, since the host vehicle V enters the intersection I over the stop line 21, it is determined that the host vehicle V proceeded in a specific direction where the vehicles are prohibited from proceeding in the intersection I. It is determined that there is a possibility that another vehicle 5F traveling in the intersection lane K4 and the host vehicle V will come into contact with each other. A contact position O where the other vehicle 5F and the host vehicle V will come into contact with each other is calculated, and among the plurality of intersection lanes K1 to K4, the intersection lane K3 which is on a side nearer than the contact position O is set as the first near side intersection lane. The route to enter the intersection lane K3 is calculated as the withdrawal route candidate.

Since a pedestrian 51 is walking at the position of the intersection lane K3 in a crosswalk C, it is determined that a moving obstacle is present on the withdrawal route candidate. The intersection lane K2 which is on a side nearer than the intersection lane K3 is set as a second near side intersection lane. The withdrawal route candidate is changed to a route to enter the intersection lane K2 which is the second near side intersection lane. Since a moving obstacle such as a pedestrian is not present in intersection lane K2, a route to enter the intersection lane K2 is determined as the withdrawal route candidate. The host vehicle V is autonomously driven based on the travel plan along the determined withdrawal route candidate. As a result thereof, the host vehicle V turns left, changes the route to the intersection lane K2, proceeds along the intersection lane K2, and then, leaves from the intersection I.

As described above, in the driving assistance apparatus 200 also, it is possible to prevent the host vehicle V from interfering with the traffic. In addition, in the driving assistance apparatus 200, if it is determined that another surrounding object (the pedestrian 51) is present on the withdrawal route candidate, the withdrawal route candidate is changed to a route enter the second near side intersection lane which is on a side nearer than the first near side intersection lane. In this way, even if another surrounding object is present, it is possible to prevent the host vehicle V from coming into contact with other surrounding object.

Third Embodiment

Next, a driving assistance apparatus according to a third embodiment will be described. In the description of the present embodiment, a point different from that in the first embodiment will be described.

Figure 8:
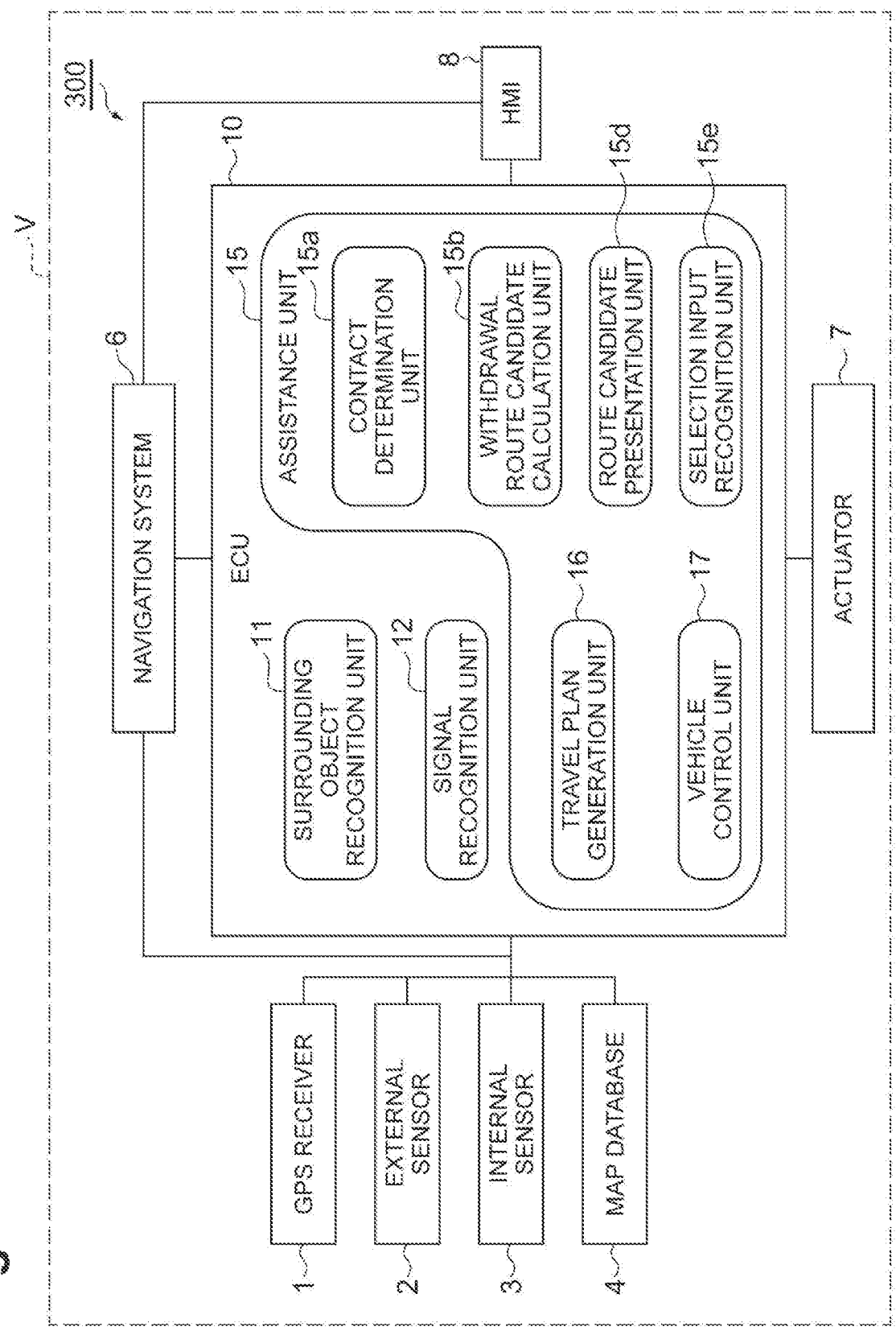
FIG. 8 is a block diagram illustrating a driving assistance apparatus in a third embodiment.

FIG. 8 is a block diagram illustrating a driving assistance apparatus 300 in the third embodiment. As illustrated in FIG. 8, in the driving assistance apparatus 300, the withdrawal route candidate calculation unit 15b of the assistance unit 15 calculates a plurality of withdrawal route candidates. The plurality of calculated withdrawal route candidates are the routes to enter each of a plurality of intersection lanes which are different from each other and are in the near side of the contact position O. The assistance unit 15 further includes a route candidate presentation unit 15d and a selection input recognition unit 15e.

The route candidate presentation unit 15d presents the plurality of withdrawal route candidates calculated by the withdrawal route candidate calculation unit 15b to the occupant via the HMI 8.

The presentation mode is not particularly limited, and various modes using display, sound, and the like can he adopted. The presentation may be performed via a device or equipment other than the HMI 8. If an input (hereinafter, referred to as "selection input") for selecting one of the plurality of withdrawal route candidates is performed by the occupant via the HMI 8, the selection input recognition unit 15e recognizes the selection. The selection input may be input from the occupant via a device or equipment other than the HMI 8.

In the driving assistance apparatus 300, the travel plan generation unit 16 generates a travel plan along the withdrawal route candidate according to the selection input recognized by the selection input recognition unit 15e. The vehicle control unit 17 performs the autonomous driving control of the host vehicle V based on the generated travel plan.

FIG. 9 is a flowchart illustrating processing for the driving assistance performed by the driving assistance apparatus 300 in FIG. 8. The processing in the flowchart illustrated in FIG. 9 is performed by the ECU 10 while the host vehicle V is traveling by the autonomous driving.

First, as illustrated in FIG. 9, the contact determination unit 15a determines whether or not the host vehicle V enters the intersection I where the traffic signal TL having the state of the light color as red light is installed (STEP S21). If YES in STEP S21, the contact determination unit 15a determines whether or not there is a contact possibility of coming into contact with other vehicles 5 in the intersection lanes K1 to K4 (STEP S22).

If YES in STEP S22, the withdrawal route candidate calculation unit 15b calculates a plurality of withdrawal route candidates (STEP S23). The route candidate presentation unit 15d presents the plurality of withdrawal route candidates calculated by the withdrawal route candidate calculation unit 15b to the occupant via the HMI 8 (STEP S24). If the selection input is input from the occupant via the HMI 8, the selection input recognition unit 15e recognizes the selection input (YES in STEP S25 and STEP S26). If the selection input is not input from the occupant via the HMI 8, the process returns to S24 and a plurality of withdrawal route candidates are continued to be presented (NO in STEP S25).

The travel plan generation unit 16 generates a travel plan along the withdrawal route candidate. The vehicle control unit 17 performs the autonomous driving control based on the travel plan (STEP S27). Subsequent to STEP S27, if the host vehicle V leaves from the intersection I (YES in STEP S28), the process returns to STEP S21. If NO in STEP S21 or if NO in STEP S22, the vehicle control unit 17 performs the autonomous driving control based on the existing travel plan (STEP S29). Subsequent to STEP S29, the process returns to STEP S21.

As described above, in the driving assistance apparatus 300 also, it is possible to prevent the host vehicle V from interfering with the traffic. In addition, in the driving assistance apparatus 300, a plurality of withdrawal route candidates are calculated and the plurality of calculated withdrawal route candidates are presented to the occupant. If the selection input is performed by the occupant, the operation control of the host vehicle V is performed based on the withdrawal route candidate according to the selection input. In this way, it possible to prevent the host vehicle V from interfering with the traffic based on the input from occupant.

For example, if the selection input is not input from the occupant even after a certain time has elapsed from the presentation of a plurality of withdrawal route candidates is started (after the start of STEP S24), any one of the plurality of withdrawal route candidates (as an example, the withdrawal route candidate similar to that in the first embodiment) may be automatically selected. In this case, the travel plan generation unit 16 generates a travel plan according to the automatically selected withdrawal route candidate.

As above, the embodiments are described above, the present disclosure is not limited to the embodiment described above. An aspect of the present disclosure can be embodied in various forms including various modifications and improvements based on the knowledge of those skilled in the art, including the above-described embodiments.

In the embodiments described above, the autonomous driving control is performed, however, the host vehicle V may travel by a manual driving without performing the autonomous driving control. If the host vehicle V is driven by the manual driving, for example, the assistance unit 15 may present or notify the driver of one or a plurality of calculated withdrawal route candidates via the HMI 8.

In the second embodiment described above, other obstacles such as pedestrian 51 were described as other surrounding objects, however, other surrounding objects are not particularly limited. Other surrounding objects may be another object different from the surrounding object in which it is determined by the contact determination unit 15a that there is a contact possibility. In the embodiments described above, the intersection I having intersection lanes K1 to K4 is exemplified, however, the type of intersection is not particularly limited, and the number of intersection lanes included in intersection is not particularly limited, either. In the embodiments described above, a part of each function of the ECU 10 may be performed in a computer of a facility such as an information processing center capable of communicating with the host vehicle V.

What is claimed is:

1. A driving assistance apparatus comprising:
a processor configured to:
detect a surrounding object around a host vehicle;
detect a state of a light color of a traffic signal in front of the host vehicle;
determine whether there is a predicted contact position where it is predicted that the host vehicle will come into contact with the detected surrounding obj ect when the detected state of the light color in an intersection of the traffic signal is a state of prohibiting the host vehicle from proceeding in a specific direction and the host vehicle enters the intersection from a first intersection lane and proceeds in the specific direction;
determine a withdrawal route candidate for the host vehicle to leave from the intersection without coming into contact with the detected surrounding object based on determining that there is the predicted contact position where it is predicted that the host vehicle will come into contact with the detected surrounding obj ect; and
perform autonomous driving control of the host vehicle so that the host vehicle travels along the determined withdrawal route candidate to avoid contact with the detected surrounding object and leave the intersection,
wherein the determining of the withdrawal route candidate includes determining, as the withdrawal route candidate, a route to leave the intersection via a second intersection lane that intersects the first intersection lane and that is nearest to an intersection lane in which the predicted contact position would occur, from among a plurality of intersection lanes that intersect the first intersection lane and that are located between the predicted contact position and the host vehicle,
wherein the processor is further configured to:
determine whether or not another surrounding obj ect is present on the withdrawal route candidate;
based on a third intersection lane that is second nearest to and running parallel with the intersection lane in which the predicted contact position would occur being detected, change the withdrawal route candidate to a route to enter the third intersection lane in response to determining that the other surrounding object is present on the withdrawal route candidate; and
based on the third intersection lane not being detected, perform autonomous driving control of the host vehicle to cause the host vehicle to perform an avoidance behavior in response to the determination that the other surrounding object is present on the withdrawal route candidate, the avoidance behavior including performing a steering control to make a traveling direction of the host vehicle same as a traveling direction of the surrounding object in the first intersection lane.

2. The driving assistance apparatus according to claim 1, wherein the processor is further configured to:
calculate a surrounding object predicted route which is a predicted route of the detected surrounding object and a host vehicle predicted route which is a predicted route of the host vehicle,
determine, based on the surrounding object predicted route and the host vehicle predicted route, whether or not there is the predicted contact position where it is predicted that the host vehicle will come into contact with the detected surrounding obj ect based on the surrounding object predicted route and the host vehicle predicted route, and
determine, as the withdrawal route candidate, a withdrawal route that is different from the host vehicle predicted route based on determining that there is the predicted contact position where it is predicted that the host vehicle will come into contact with the detected surrounding object.

3. The driving assistance apparatus according to claim 2, wherein the processor is further configured to:
determine a plurality of withdrawal route candidates,
present the plurality of determined withdrawal route candidates to an occupant,
receive a user selection of one of the plurality of determined withdrawal route candidates, and
perform the autonomous driving control of the host vehicle based on the one of the plurality of withdrawal route candidates corresponding to the user selection.

4. The driving assistance apparatus according to claim 1, wherein the processor is further configured to:
determine a plurality of withdrawal route candidates,
present the plurality of determined withdrawal route candidates to an occupant,
receive a user selection of one of the plurality of determined withdrawal route candidates, and
perform the autonomous driving control of the host vehicle based on the one of the plurality of withdrawal route candidates corresponding to the user selection.

5. The driving assistance apparatus according to claim 1, wherein the processor is further configured to:
determine a plurality of withdrawal route candidates,
present the plurality of determined withdrawal route candidates to an occupant,
receive a user selection of one of the plurality of determined withdrawal route candidates, and
perform the autonomous driving control of the host vehicle based on the one of the plurality of withdrawal route candidates corresponding to the user selection.

6. A driving assistance apparatus comprising:
a processor configured to:
detect a surrounding object around a host vehicle;
determine whether there is a predicted contact position, where it is predicted that the host vehicle will come into contact with the detected surrounding object, when the host vehicle enters an intersection from a first intersection lane;
determine a withdrawal route candidate for the host vehicle to leave from the intersection without coming into contact with the detected surrounding object based on determining that there is the predicted contact position where it is predicted that the host vehicle will come into contact with the detected surrounding object; and perform autonomous driving control of the host vehicle so that the host vehicle travels along the determined withdrawal route candidate to avoid contact with the detected surrounding object and leave the intersection, wherein the determining of the withdrawal route candidate includes determining, as the withdrawal route candidate, a route to leave the intersection via a second intersection lane that intersects the first intersection lane and that is nearest to an intersection lane in which the predicted contact position would occur, from among a plurality of intersection lanes that intersect the first intersection lane and that are located between the predicted contact position and the host vehicle wherein the processor is further configured to:

determine whether another surrounding object is present on the withdrawal route candidate;

based on a third intersection lane that is second nearest to and running parallel with the intersection lane in which the predicted contact position would occur being detected, change the withdrawal route candidate to a route to enter the third intersection lane in response to determining that the other surrounding object is present on the withdrawal route candidate; and based on the third intersection lane not being detected, perform autonomous driving control of the host vehicle to cause the host vehicle to perform an avoidance behavior in response to the determination that the other surrounding object is present on the withdrawal route candidate, the avoidance behavior including performing a steering control to make a traveling direction of the host vehicle same as a traveling direction of the surrounding object in the first intersection lane.

7. The driving assistance apparatus according to claim 6, wherein the processor is further configured to perform the autonomous driving control of the host vehicle so that the host vehicle travels along the determined withdrawal route candidate.

8. A driving assistance method comprising:

detecting a surrounding object around a host vehicle;

determining whether there is a predicted contact position, where it is predicted that the host vehicle will come into contact with the detected surrounding object, when the host vehicle enters an intersection from a first intersection lane;

determining a withdrawal route candidate for the host vehicle to leave from the intersection without coming into contact with the detected surrounding object based on determining that there is the predicted contact position where it is predicted that the host vehicle will come into contact with the detected surrounding object; and performing autonomous driving control of the host vehicle so that the host vehicle travels along the determined withdrawal route candidate to avoid contact with the detected surrounding object and leave the intersection, wherein the determining of the withdrawal route candidate includes determining, as the withdrawal route candidate, a route to leave the intersection via a second intersection lane that intersects the first intersection lane and that is nearest to an intersection lane in which the predicted contact position would occur, from among a plurality of intersection lanes that intersect the first intersection lane and that are located between the predicted contact position and the host vehicle, wherein the method further comprises:

determining whether another surrounding object is present on the withdrawal route candidate;

changing, based on a third intersection lane that is second nearest to and running parallel with the intersection lane in which the predicted contact position would occur being detected, the withdrawal route candidate to a route to enter the third intersection lane in response to determining that the other surrounding object is present on the withdrawal route candidate; and performing, based on the third intersection lane not being detected, autonomous driving control of the host vehicle to cause the host vehicle to perform an avoidance behavior in response to the determination that the other surrounding obj ect is present on the withdrawal route candidate, the avoidance behavior including performing a steering control to make a traveling direction of the host vehicle same as a traveling direction of the surrounding object in the first intersection lane.

\* \* \* \* \*